United States Patent [19]

Deki

[11] Patent Number: 4,862,475
[45] Date of Patent: Aug. 29, 1989

[54] HOLLOW-CATHODE TYPE METAL VAPOR LASER TUBE

[75] Inventor: Kyoichi Deki, Kakogawa, Japan

[73] Assignee: Ushio Denki Kabushiki Kaisha, Tokyo, Japan

[21] Appl. No.: 246,202

[22] Filed: Sep. 19, 1988

[51] Int. Cl.$^4$ .............................................. H01S 3/03
[52] U.S. Cl. ...................................... 372/61; 372/88; 372/56
[58] Field of Search ............... 376/61, 65, 56; 372/88, 372/87

[56] References Cited

U.S. PATENT DOCUMENTS 4,701,925  10/1987  Fuke et al. .............................. 372/56
4,710,938  12/1987  Fuke et al. .............................. 372/56

OTHER PUBLICATIONS

The Transactions of the IECE of Japan, vol. E 69, No. 4, Apr. 1986 "Characteristics of He–Cd White Light Laser".
Laser Study, vol. 14, No. 10, Oct. 1986.

Primary Examiner—Leon Scott, Jr.
Attorney, Agent, or Firm—Robert F. Ziems

[57] ABSTRACT

A metal vapor laser tube of the hollow-cathode type which is simplified in construction and can be assembled by a simple work without much skill and wherein a negative glow portion can be produced stably and an essential function is attained satisfactorily. The metal vapor laser tube comprises a central metal tube member serving as a cathode, and a pair of hard glass end tube members, metal cap members and holding tube members connected in this order in an air-tight relationship to the opposite ends of the central tube member. A Brewster window or a mirror is provided on each of the cap members. An anode member is securely inserted in each of a lot of through-holes formed in the central tube member by way of an insulating member such that an end thereof may be positioned in a discharge opening of the through-hole. A container for containing a working metal therein is securely inserted in each of a lot of different through-holes formed in the central tube member such that the inside thereof may communicate with a fine axial hole of the central tube member. The central tube member constitutes an enclosure for vapor of the working metal.

9 Claims, 5 Drawing Sheets

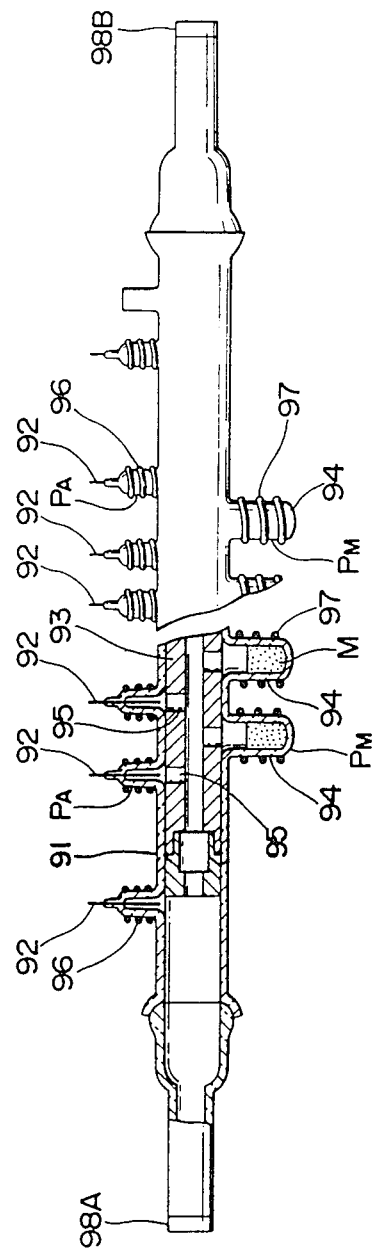

HOLLOW-CATHODE TYPE METAL VAPOR LASER TUBE

BACKGROUND OF THE INVENTION

1. Field of the Invention

This invention relates to a metal vapor laser tube, and particularly to a metal vapor laser tube of the hollow-cathode type.

2. Description of the Prior Art

A metal vapor laser tube generates laser oscillations making use of vapor of a metal which is enclosed in the metal vapor laser tube together with a rare gas.

An exemplary one of metal vapor laser tubes which are practically used at present is a so-called positive column type metal vapor laser tube which generates laser oscillations making use of a positive column portion of a discharge. More particularly, a positive column type metal vapor laser tube which employs cadmium and helium therein is known.

Such a positive column type metal vapor laser tube which employs cadmium and helium therein can oscillate continuously at an ultraviolet wavelength of 325 nm as well as a visible wavelength of 442 nm in a short wavelength zone. Due to the characteristic, the demand for such positive column type metal vapor laser tubes has increased in recent years, and metal vapor laser tubes of the positive column type are used in various fields as light sources, for example, for laser printers, fabrication of color reproduction plates, photo-plotters, production of a semiconductor laser device of the DFB type, and particle measuring instruments.

A metal vapor laser tube of a different type from such a positive column type metal vapor laser tube is also known in principle which is called a hollow-cathode type metal vapor laser tube which generates laser oscillations making use of a negative glow portion of a discharge. Of late, increasing attention is paid particularly to a hollow-cathode type metal vapor laser tube which employs helium and cadmium therein due to its characteristics that it can oscillate continuously not only at an ultraviolet wavelength of 325 nm and at a visible wavelength of 442 nm in the short wavelength zone but also at a visible wavelength of 636 nm in the red zone and at visible wavelengths of 538 nm and 533 nm in the green zone. Besides, it is possible to reduce noises about by one tenth comparing with a positive column type metal vapor laser tube.

Exemplary construction of such a conventional hollow-cathode type metal vapor laser tube which has been manufactured for trial so far as described above is illustrated in FIG. 7. Referring to FIG. 7, the hollow-cathode type metal vapor laser tube shown includes a glass enclosure or tube 91, a lot of anode members 92, a cathode member 93 having a lot of discharge openings 95 formed therein, a lot of working metal containers 94 formed on the glass enclosure 91, heaters 96 and 97, and a pair of mirrors 98A and 98B. The glass enclosure 91 has, for example, helium enclosed therein, and a working metal M which may be, for example, cadmium is contained in the working metal containers 94. The heaters 96 are provided around respective projecting tube portions $P_A$ for holding anode members 92 formed on the glass enclosure 91 while the heaters 97 are provided around respective projecting tube portions $P_M$ of the glass enclosure 91 which form the working metal containers 94.

Such a hollow-cathode type metal vapor laser tube of the construction described above, however, has following drawbacks:

(1) It is a drawback that, since the glass enclosure 91 is complicated in structure, glasswork with high skill is required, and consequently mass-production by mechanization cannot be attained and it is difficult to put it into practical use as an industrial manufacture.

In particular, a time consuming and skillful work is required to form, on an outer wall of the glass enclosure 91, a large number of projecting tube portions $P_A$ in which the anode members 92 are installed and another large number of projecting tube portions $P_M$ in which the working metal M is contained. Besides, a time consuming and skillful work is required to seal and secure such a large number of anode members 92 in a right condition to the projecting tube portions $P_A$. After all, it is impossible to establish an industrial production system by mechanization, and accordingly it is difficult to manufacture a hollow-cathode type metal vapor laser tube.

(2) When a laser is oscillated, the glass enclosure 91 which is normally made of hard glass is heated to a considerably high temperature by the heaters 96 and 97, and the glass enclosure 91 and the cathode member 93 which is normally made of copper, titanium or iron are heated to a high temperature also by heat of a discharge. Thermal expansions of the glass enclosure 91 and the cathode member 93 thus cause a change in relative position between the positions of inner ends of the anode members 92 and the discharge openings 95 formed in the cathode member 93. The change in relative position particularly increases substantially in proportion to the length of the glass enclosure 91. Consequently, a negative glow portion may be readily changed transiently or partially into an arc discharge and it cannot maintain stable discharge. It is a problem, therefore, that after all a function of the hollow-cathode type metal vapor laser tube as such is deteriorated.

It is to be noted that the discharge openings 95 should have an appropriate range in size and when the size of them is excessively great, the gain in laser oscillation is reduced. Accordingly, it is impossible in practical use to provide the discharge openings 95 of such a large diameter that can absorb a change in such relative position as described above which arises from thermal expansions.

SUMMARY OF THE INVENTION

It is an object of the present invention to provide a metal vapor laser tube of the hollow-cathode type which is simplified in construction and can be assembled by a simple work without much skill.

It is another object of the present invention to provide a metal vapor laser tube of the hollow-cathode type wherein a negative glow portion can be produced stably and a function as a hollow-cathode type metal vapor laser tube is attained satisfactorily.

In order to attain the objects, according to the present invention, a metal vapor laser tube of the hollow-cathode type comprises a central tube member made of a metal and serving as a cathode, the central tube member having a fine hole which extends in the direction of an axis of the central tube member and defines a laser oscillating path, the central tube member further having a large number of anode member receiving through-holes formed in a juxtaposed spaced relationship in the direction of the axis thereof and extending therethrough from an outer wall in one side thereof to the fine hole therein, each of the anode member receiving through-holes having a discharge opening communicating with the fine hole, the central tube member further having a large number of working metal container receiving through-holes formed in a juxtaposed spaced relationship in the direction of the axis thereof and extending therethrough from the outer wall in another side thereof to the fine hole therein, a pair of end tube members made of a hard glass and connected in an air-tight relationship to the opposite ends of the central tube member, a pair of cap members made of a metal and connected in an air-tight relationship to outer ends of the end tube members, each of the cap members having an opening formed at a central location thereof, a pair of holding tube members connected in an air-tight relationship to the cap members in such a manner as to communicate with the openings of the cap members for holding a pair of Brewster windows or mirrors thereon, anode members inserted respectively in the anode member receiving through-holes of the central tube member and secured in an air-tight relationship to the central tube member by way of an insulating member such that an end thereof may be positioned in the discharge opening of the anode member receiving through-hole, and working metal containers inserted respectively in the working metal container receiving through-holes of the central tube member and secured in an air-tight relationship to the central tube member such that the inside thereof may communicate with the fine hole of the central tube member, the central tube member constituting an enclosure.

The metal vapor laser tube of the hollow-cathode type according to the present invention is simplified in structure and can be assembled by a simple work without much skill. Besides, a negative glow portion can be produced stably and characteristics as a hollow-cathode type metal vapor laser tube are attained satisfactorily.

In particular, since the enclosure is composed of the central tube member made of a metal and serving as a cathode, such a glass enclosure for encircling a cathode as in a conventional hollow-cathode type metal vapor laser tube is not required, and consequently skillful glasswork is unnecessary. Further, the anode member receiving through-holes and the working metal container receiving through-holes can be formed rapidly by simple mechanical workings, and besides fixation of the anode members and fixation of the working metal containers can be performed by simple workings. As a result, the hollow-cathode type metal vapor laser tube is simplified in structure and can be assembled by a simple operation without the necessity of much skill, and accordingly an industrial production system by mechanization can be established, permitting mass-production of hollow-cathode type metal vapor laser tubes and enabling hollow-cathode type metal vapor laser tubes to be put into practical use as industrial products.

Since the anode members are inserted into the anode member receiving through-holes formed in the central metal tube member and are secured in an air-tight relationship to the central tube member by way of the insulating members such that the inner ends thereof may be positioned at the discharge openings communicating with the fine hole of the central tube member, the anode members are integrally secured in position relative to the central tube member which is made of a metal and serves as a cathode. Accordingly, even if the positions of the discharge openings are changed by thermal expansion of the central metal tube member, the positions of the inner ends of the anode members are changed following such change in position of the discharge openings so that the relative positions between the discharge openings and the inner ends of the anode members do not present a substantial change. Consequently, a negative glow portion can be obtained stably in each of the discharge openings and will not be changed transiently or partially into an arc discharge at all. After all, the hollow-cathode type metal vapor laser tube exhibits sufficient characteristics as such.

Where the central tube member, end tube members and cap members are made of materials having similar coefficients of thermal expansion such that the central tube member is made of covar, the end tube members are made of covar glass and the cap members are made of covar, even if the hollow-cathode type metal vapor laser tube is heated to a high temperature, it can exhibit a stable air-tight property and can effectively prevent a crack for a long time.

The above and other objects, features and advantages of the present invention will become apparent from the following description and the appended claims, taken in conjunction with the accompanying drawings.

BRIEF DESCRIPTION OF THE DRAWINGS

FIG. 7 is a side elevational sectional view, partly cut out and partly in section, showing an exemplary conventional metal vapor laser tube of the hollow-cathode type.

DESCRIPTION OF THE PREFERRED EMBODIMENT

Figure 1:
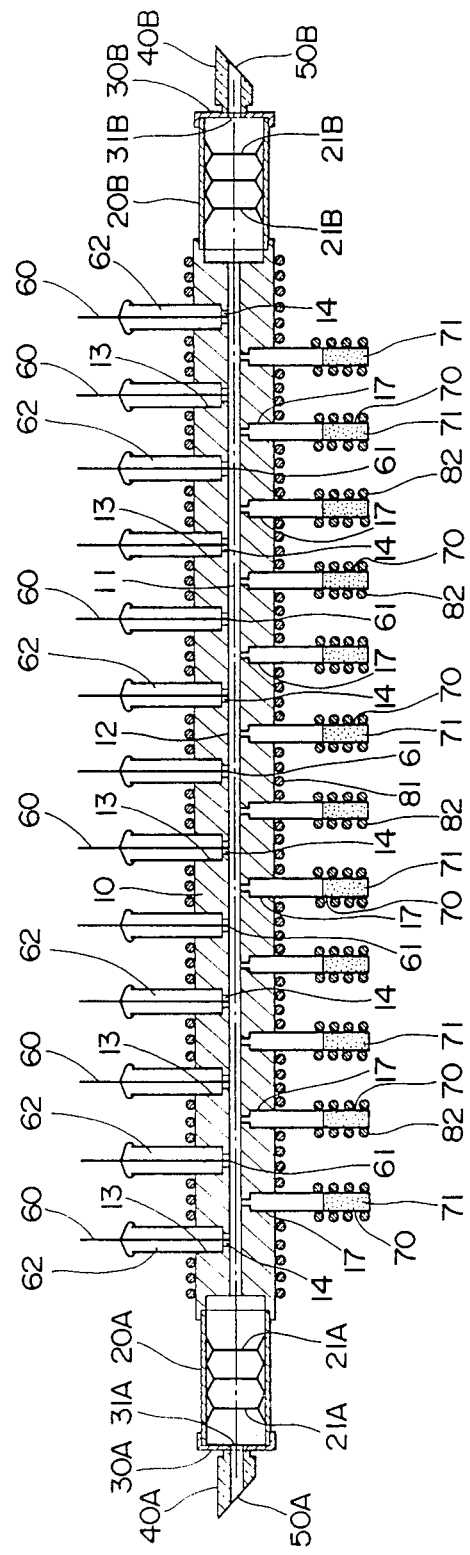
FIG. 1 is a longitudinal sectional view illustrating general construction of a metal vapor laser tube of the hollow-cathode type according to an embodiment of the present invention.

Referring first to FIG. 1, there is shown a metal vapor laser tube of the hollow-cathode type according to a preferred embodiment of the present invention. The hollow-cathode type metal vapor laser tube shown includes a central tube member 10 made of a metal and defining a laser oscillating path 11 therein, a pair of end tube members 20A and 20B made of a hard glass material and secured to the opposite ends of the central tube member 10, a pair of cap members 30A and 30B made of a metal and secured to outer ends of the end tube members 20A and 20B, respectively, a pair of holding tube members 40A and 40B secured to the cap members 30A and 30B, respectively, and having Brewster windows 50A and 50B provided thereon, respectively, a large number of, 13 in the arrangement of FIG. 1, anode members 60 provided on one side of the central tube member 10, and a large number of, 12 in the arrangement of FIG. 1, working metal containers 70 provided on another side of the central tube member 10 and having a working metal 71 contained therein.

The central tube member 10 made of a metal serves as a cathode and also as an enclosure. A fine hole 12 is formed in the central tube member 10 and extends in the direction of a longitudinal axis of the central tube member 10. The fine hole 12 provides the laser oscillating path 11 described above. The central tube member 10 is preferably made of a material having a similar coefficient of thermal expansion to that of the hard glass material of the end tube members 20A and 20B, which will be hereinafter described in detail, to be secured to the opposite ends of the central tube member 10 in order to attain a high air-tight sealing performance with the latter. Covar, for example, is preferably employed as a material of the central tube member 10.

A large number of anode member receiving through-holes 13 are formed in a juxtaposed spaced relationship in the axial direction of the central tube member 10 in an upper side, for example, of the central tube member 10 and extends radially inwardly from an upper side outer wall of the central tube member 10 to the fine hole 12 in the central tube member 10. Each of the anode member receiving through-holes 13 has a contiguous discharge opening 14 provided adjacent the fine hole 12.

Figure 2A:
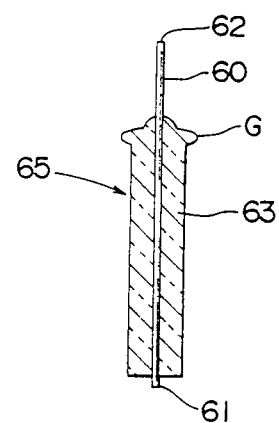
FIG. 2a is an enlarged cross sectional view showing an anode unit of the hollow-cathode type metal vapor laser tube of FIG. 1.
Figure 2B:
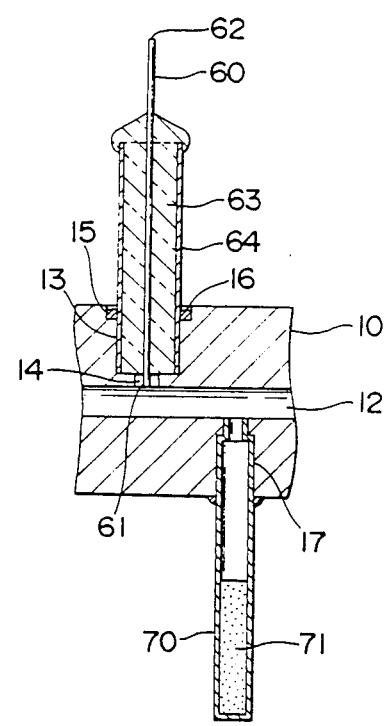
FIG. 2b is an illustrative cross sectional view of the anode unit in an assembled condition.

The anode members 60 are individually inserted in the anode member receiving through-holes 13 of the central tube member 10 and each secured in an air-tight relationship to the central tube member 10 by way of an insulating member 63 such that an inner end 61 thereof may be located substantially at the center of the discharge opening 14. More particularly, a large number of such anode units 65 as shown in FIG. 2a are at first produced which each includes a pin-like anode member 60 made of, for example, covar and a column-like insulating member 63 made of, for example, covar glass and covering the anode member 60 such that the inner end 61 and an outer end 62 of the anode member 60 may extend outwardly of the insulating member 63. Meanwhile, a tubular connecting metal member 64 made of, for example, covar is inserted into each of the anode member receiving through-holes 13 of the central tube member 10 and connected in an air-tight relationship to the central tube member 10 as shown in FIG. 2b. The anode units 65 are then inserted into the connecting metal members 64 such that the inner ends 61 of the anode members 60 thereof may be located at the discharge openings 14 as seen in FIG. 2b. After then, sealing glass portions G (FIG. 2a) at the outer ends of the insulating members 63 of the anode units 65 are melted to seal the insulating members 63 and the outer ends of the connecting metal members 64 in an air-tight relationship to each other. The connecting metal members 64 may each be securely connected to the central tube member 10 by brazing with a brazing material 16 in the form of, for example, a copper wire which is placed in an annular groove 15 formed adjacent the open end of each of the anode member receiving through-holes 13 so as to surround the connecting metal member 64 after inserted in the anode member receiving through-hole 13. Such brazing can be effected making use of an electric furnace of a hydrogen atmosphere. For heating of the sealing glass portions G of the insulating members 63 to seal the insulating members 63 and the connecting metal members 64 in an air-tight relationship relative to each other, such means as, for example, a gas burner and a high frequency heater may be employed. The anode members 60, insulating members 63 and connecting metal members 64 are preferably made of materials having similar coefficients of thermal expansion in order to assure a high air-tight sealing performance therebetween. It is to be noted that care must be taken so that the inner end 61 of an anode member 60 may not advance into the fine hole 12 of the central tube member 10 because, if otherwise it is advanced into the fine hole 12, it may possibly interrupt a laser beam.

A large number of working metal container receiving through-holes 17 are formed in a juxtaposed spaced relationship in the axial direction of the central tube member 10, for example, in a lower side of the central tube member 10 and extends radially inwardly from lower side outer wall of the central tube member 10 to the fine hole 12 in the central tube member 10.

The working metal containers 70 are inserted in the container receiving through-holes 17 of the central tube member 10 and each secured in an air-tight relationship to the central tube member 10 by brazing with brazing copper, for example, in the form of a wire such that the inside thereof may communicate with the fine hole 12 of the central tube member 10. The containers 70 may have a structure wherein a pipe of a metal such as, for example, nickel is pressed at an outer end portion thereof to close air-tightly. The working metal 71 which may be, for example, cadmium, zinc, selenium or tellurium is contained in the form of powder or the like within the containers 70. Iodine or some other element may be contained in the working metal 71.

A first heater 81 is disposed or wound around an outer periphery of the central tube member 10, and a second heater 82 is disposed or wound around an outer periphery of each of the containers 70. The first heater 81 is provided so as to uniformly heat the entire inside of the central tube member 10 to cause vapor of the working metal to distribute uniformly within the central tube member 10 while the second heaters 82 are provided so as to heat the working metal 71 contained in the containers 70 to evaporate. The first and second heaters 81 and 82 are designed such that they may be controlled to heat independently of each other. Accordingly, each of the containers 70 can be controlled to a heating temperature independent from the heating temperature of the central tube member 10 so that the working metal 71 can be evaporated into vapor in an optimum condition. Further, since the containers 70 are made of a metal, there is an advantage that heating control for the working metal 71 by the second heaters 82 is facilitated.

Figure 3A:
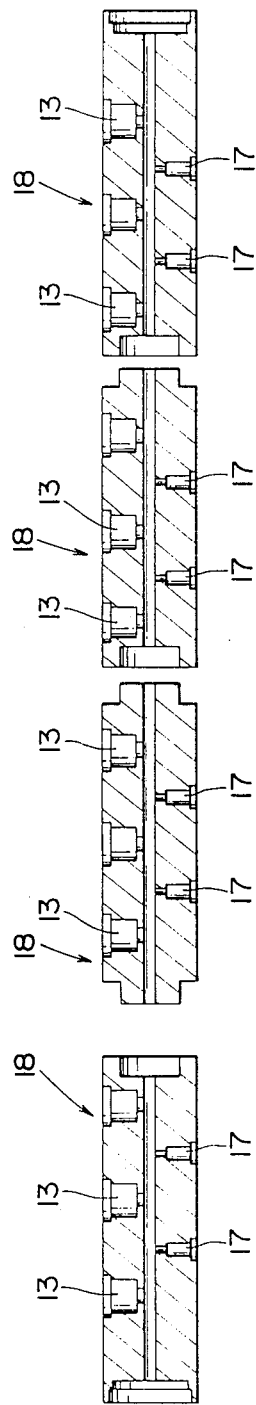
FIG. 3a is a longitudinal sectional view showing tube parts of a central tube member of the hollow-cathode type metal vapor laser tube of FIG. 1.
Figure 3B:
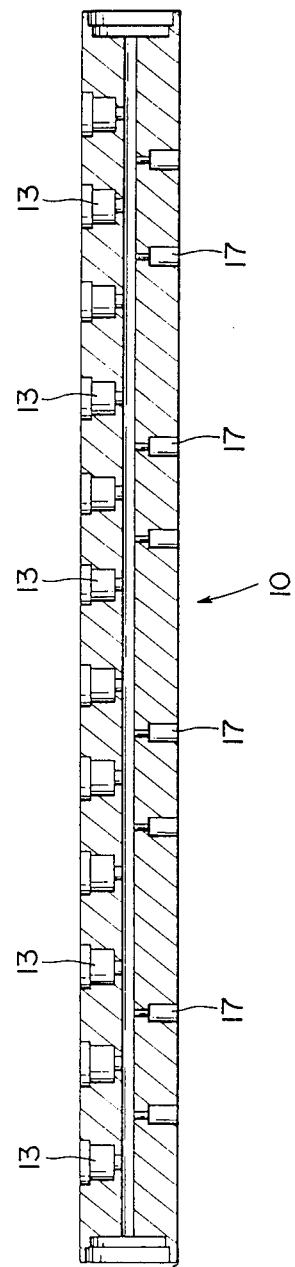
FIG. 3b is a longitudinal sectional view showing the tube parts integrally assembled into the central tube member.

The central tube member 10 is preferably composed of such a plurality of tubular parts 18 made of a metal and having several anode member receiving through-holes 13 and several container receiving through-holes 17 formed therein as shown in FIG. 3a. The tubular parts 18 are preferably brazed and connected in an air-tight relationship to each other with a brazing material such as, for example, a brazing copper material to form the central tube member 10 as a unitary member as seen in FIG. 3b. With such a construction described just above, even where the central tube member 10 is required to have a great length, the through-holes can be formed by a simple operation and accordingly the productivity of the central tube member 10 is improved.

The end tube members 20A and 20B are made of hard glass and securely connected in an air-tight relationship to the opposite ends of the central tube member 10. Where the central tube member 10 is made of covar, the end tube members 20A and 20B are preferably made of covar glass which has a similar coefficient of thermal expansion to that of covar.

Figure 5:
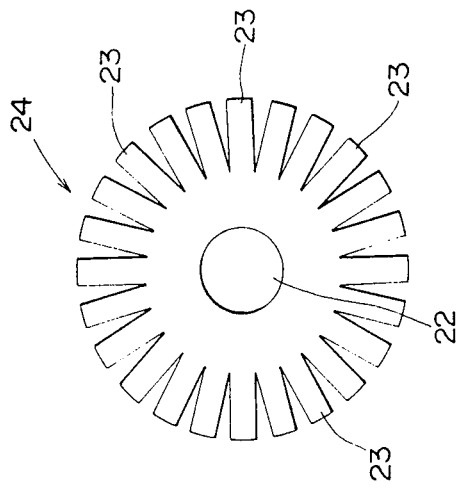
FIG. 5 is an enlarged developed view showing a metal vapor passage controlling member of the hollow-cathode type metal vapor laser tube of FIG. 1.
Figure 4:
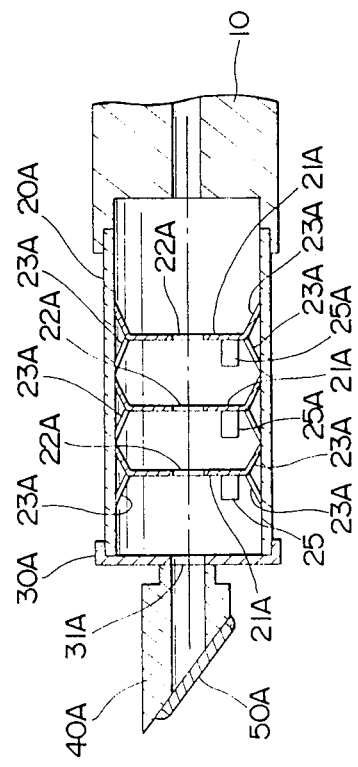
FIG. 4 is an enlarged partial longitudinal sectional view illustrating detailed structure of an end tube member of the hollow-cathode type metal vapor laser tube of FIG. 1.

The end tube members 20A and 20B have metal vapor passage controlling metal members 21A and 21B disposed therein, respectively, such that they may occupy spacings around the laser oscillating path 11. The metal vapor passage controlling metal members 21A and 21B are made of a metal such as, for example, stainless steel and are biased to a positive potential. Referring also to FIG. 4, each of the metal vapor passage controlling metal members 21A substantially has a form of a disk having a thickness of, for example, 0.2 mm or so and having an opening 22A formed at a central location thereof, and has a large number of tongues 23A formed on and bent alternately in the opposite directions from an outer periphery thereof and held in contact with an inner wall of the end tube member 20A. In the arrangement shown, up to three such metal vapor passage controlling metal members 21A are provided. The metal vapor passage controlling metal members 21B in the other end tube member 20B has a similar construction. Each of the metal vapor passage controlling metal members 21A and 21B may be formed, for example, from such a thin plate 24 of a substantially disk shape as shown in FIG. 5 which has an opening 22 formed at a central location thereof and has a large number of tongues 23 formed on an outer periphery thereof. The thin plate 24 is at first formed by etching or press shaping, and the tongues 23 thereof are then bent alternately in the opposite directions. A getter 25A for absorbing therein impurities existing in the discharge spacing is provided on each of the metal vapor passage controlling metal members 21A and 21B, respectively. The getters 25A may be formed, for example, from sintered plates of aluminum and zirconium.

The cap members 30A and 30B are made of a metal and have openings 31A and 31B formed at central locations thereof, respectively. The cap members 30A and 30B are securely connected in an air-tight relationship to the outer ends of the end tube members 20A and 20B, respectively. Where the end tube members 20A and 20B made of hard glass are made of covar glass, the cap members 30A and 30B are preferably made of covar having a similar coefficient of thermal expansion to that of covar glass.

The holding tube members 40A and 40B are made of, for example, an alloy of iron and nickel and connected in an air-tight relationship to the cap members 30A and 30B such that they may communicate with the openings 31A and 31B, respectively. In the arrangement shown in FIG. 1, the hollow-cathode type metal vapor laser tube is of the external mirror type wherein the Brewster windows 50A and 50B are secured to the outer ends of the holding tube members 40A and 40B, respectively. Though not shown, a mirror is provided on each of the Brewster windows 50A and 50B.

Figure 6:
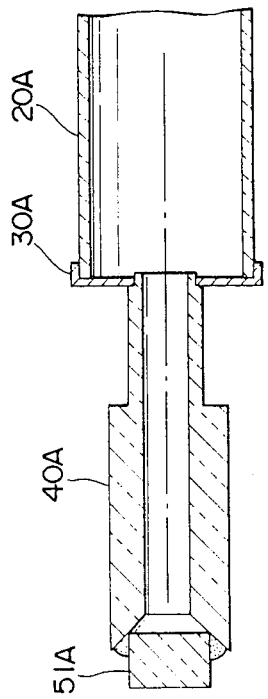
FIG. 6 is a partial longitudinal sectional view showing a holding tube member and a mirror in a hollow-cathode type metal vapor laser tube of the internal mirror type.

Referring now to FIG. 6, where the hollow-cathode type metal vapor laser tube is alternatively of the internal mirror type, a pair of mirrors 51A and 51B (only the mirror 51A is shown in FIG. 6) may be securely connected in an air-tight relationship, for example, by frit sealing to the outer ends of the holding tube members 40A and 40B, respectively, which may be made, for example, of an alloy of iron and nickel.

A rare gas such as helium or krypton is enclosed in the inside of the enclosure thus composed of the central tube members 10.

The hollow-cathode type metal vapor laser tube of the embodiment described above is thus simplified in structure and can be assembled by a simple operation without the necessity of much skill. Besides, a negative glow portion can be obtained and maintained stably in the hollow-cathode type metal vapor laser tube. Accordingly, the hollow-cathode type metal vapor laser tube according to the present invention exhibits superior characteristics sufficiently as a hollow-cathode type metal vapor laser tube.

More particularly, since the enclosure is composed of the central tube member 10 made of a metal and serving as a cathode, such a glass enclosure for encircling a cathode as in a conventional hollow-cathode type metal vapor laser tube is not required, and consequently skillful glasswork is unnecessary. Further, the anode member receiving through-holes 13 and the working metal container receiving through-holes 17 can be formed rapidly by simple mechanical operations, and besides fixation of the anode members 60 and fixation of the working metal containers 70 can be performed by simple operations. As a result, the hollow-cathode type metal vapor laser tube is simplified in structure and can be assembled by a simple operation without the necessity of much skill, and accordingly an industrial production system by mechanization can be established, permitting mass-production of hollow-cathode type metal vapor laser tubes and enabling hollow-cathode type metal vapor laser tubes to be put into practical use as industrial products.

Since the anode members 60 are inserted into the anode member receiving through-holes 13 formed in the central metal tube member 10 and are secured in an air-tight relationship to the central tube member 10 by way of the insulating members 63 such that the inner ends 61 thereof may be positioned at the discharge openings 14 communicating with the fine hole 12 of the central tube member 10, the anode members 60 are integrally secured in position relative to the central tube member 10 which is made of a metal and serving as a cathode. Accordingly, even if the positions of the discharge openings 14 are changed by thermal expansion of the central metal tube member 10, the positions of the inner ends 61 of the anode members 60 are changed following such change in position of the discharge openings 14 so that the relative positions between the discharge openings 14 and the inner ends 61 of the anode members 60 do not present a substantial change. Consequently, a negative glow portion can be maintained stably in each of the discharge openings 14 and will not be changed transiently or partially into an arc discharge at all. After all, the hollow-cathode type metal vapor laser tube exhibits sufficient characteristics as such.

Where the central tube member 10, end tube members 20A and 20B and cap members 30A and 30B are made of materials having similar coefficients of thermal expansion such that the central tube member 10 is made of covar, the end tube members 20A and 20B are made of covar glass and the cap members 30A and 30B are made of covar, even if the hollow-cathode type metal vapor laser tube is heated to a high temperature, it can exhibit a stable air-tight property and can effectively prevent a crack for a long time.

Further, since such a construction is employed that the large number of anode units 65 which are produced in advance and include the anode members 60 individually covered by the insulating members 63 such that the inner and outer ends 61 and 62 thereof may extend outwardly of the insulating members 63 are inserted into and secured to the connecting metal members 64 fitted in an air-tight relationship in the anode member 10 receiving through-holes 13 in the central tube member 10, the anode members 60 can be secured readily with a sufficient air-tight performance and a sufficient insulating performance to the anode member receiving through-holes 13.

Where the central tube member 10 is constituted by connecting in an air-tight relationship to each other a plurality of tubular parts 18 each having several anode member receiving through-holes 13 and several working metal container receiving through-holes 17 formed therein, even if the hollow-cathode type metal vapor laser tube has a great length, operations of forming the through-holes 13 and 17 can be performed readily. Accordingly, improvement in productivity of the hollow-cathode type metal vapor laser tube can be anticipated.

Where the working metal containers 70 are made of a metal and securely connected to the central tube member 10 by means of a brazing metal, a securely connecting operation of the containers 70 can be performed readily, and besides the heating controllability by the second heaters 83 is improved so that metal vapor pressure can be controlled in an optimum condition.

Where the metal vapor passage controlling metal members 21A and 21B are disposed in the end tube members 20A and 20B, respectively, such that they may occupy the spacings around the laser oscillating path 11 and are held at a positive potential, glow discharges are generated between the metal vapor passage controlling metal members 21A and 21B and the opposite end faces of the central tube member 10 serving as a cathode so that metal vapor which tend to diffuse from the opposite ends of the central tube member 10 toward the cap members 30A and 30B is pushed back toward the central tube member 10 due to a cataphoresis effect. Also an action is obtained that metal vapor is effectively trapped by the metal vapor passage controlling metal members 21A and 21B. Consequently, deposition of metal onto the Brewster windows 50A and 50B or the mirrors 51A and 51B held on the holding tube members 40A and 40B, respectively, can be prevented, and accordingly a laser beam can be oscillated with a high efficiency.

Further, since the getters 25A are disposed in the end tube members 20A and 20B, impurities existing in the discharge spacing can be removed. Accordingly, possible deterioration of the laser output of the hollow-cathode type metal vapor laser tube can be prevented effectively.

What is claimed is:

1. A metal vapor laser tube of the hollow-cathode type, comprising:

a central tube member made of a metal and serving as a cathode, said central tube member having a fine hole which extends in the direction of an axis of said central tube member and defines a laser oscillating path, said central tube member further having a large number of anode member receiving through-holes formed in a juxtaposed spaced relationship in the direction of the axis thereof and extending therethrough from an outer wall in one side thereof to said fine hole therein, each of said anode member receiving through-holes having a discharge opening communicating with said fine hole, said central tube member further having a large number of working metal container receiving through-holes formed in a juxtaposed spaced relationship in the direction of the axis thereof and extending therethrough from the outer wall in another side thereof to said fine hole therein;

a pair of end tube members made of a hard glass and connected in an air-tight relationship to the opposite ends of said central tube member;

a pair of cap members made of a metal and connected in an air-tight relationship to outer ends of said end tube members, each of said cap members having an opening formed at a central location thereof;

a pair of holding tube members having first ends connected in an air-tight relationship to said cap members with central openings in the holding tube members coaxial with the openings of said cap members and having second ends for holding a pair of Brewster windows or mirrors thereon;

anode members with each anode member inserted in a respective one of said anode member receiving through-holes of said central tube member, each of said anode members being secured in an air-tight relationship to said central tube member by way of an insulating member such that an end thereof may be positioned in said discharge opening of the anode member receiving through-hole; and working metal containers inserted respectively in said working metal container receiving through-holes of said central tube member, each of said working metal containers being secured in an air-tight relationship to said central tube member such that the inside of each working metal container communicates with said fine hole of said central tube member;

said central tube member constituting an enclosure.

2. A metal vapor laser tube of the hollow-cathode type as claimed in claim 1, wherein said central tube member is composed of a plurality of tubular parts which are connected in an air-tight relationship to each other.

3. A metal vapor laser tube of the hollow-cathode type as claimed in claim 1, wherein the working metal containers are made of a metal.

4. A metal vapor laser tube of the hollow-cathode type as claimed in claim 3, wherein said working metal containers have a working metal contained therein, said working metal being selected from the group consisting of cadmium, zinc, selenium and tellurium.

5. A metal vapor laser tube of the hollow-cathode type as claimed in claim 3, wherein a heater is provided on an outer periphery of each of said working metal containers.

6. A metal vapor laser tube of the hollow-cathode type as claimed in claim 1, wherein each of the anode members lies along the central axis of a respective insulating member having a column-like configuration and together constitute an anode unit which is inserted in a tubular connecting metal member provided in an air-tight relationship in each of said anode member receiving through-holes, said insulating member being sealed at an outer end thereof to said tubular connecting metal member.

7. A metal vapor laser tube of the hollow-cathode type as claimed in claim 1, wherein a heater is provided on an outer periphery of said central tube member.

8. A metal vapor laser tube of the hollow-cathode type as claimed in claim 1, wherein each of said end tube members has a metal vapor passage controlling metal means provided therein between said central tube member and a respective cap member.

9. A metal vapor laser tube of the hollow-cathode type as claimed in claim 8, wherein said metal vapor passage controlling metal means is composed of a plurality of disks each having an opening formed at a central location thereof.

* * * * *